May 15, 1945.  S. A. SCHERBATSKOY  2,376,195
AMPLIFYING APPARATUS
Filed Sept. 15, 1936  6 Sheets-Sheet 1
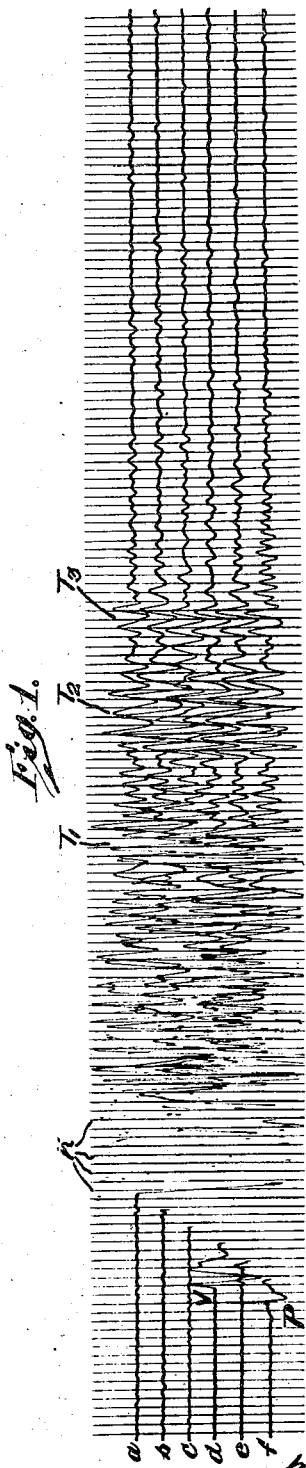
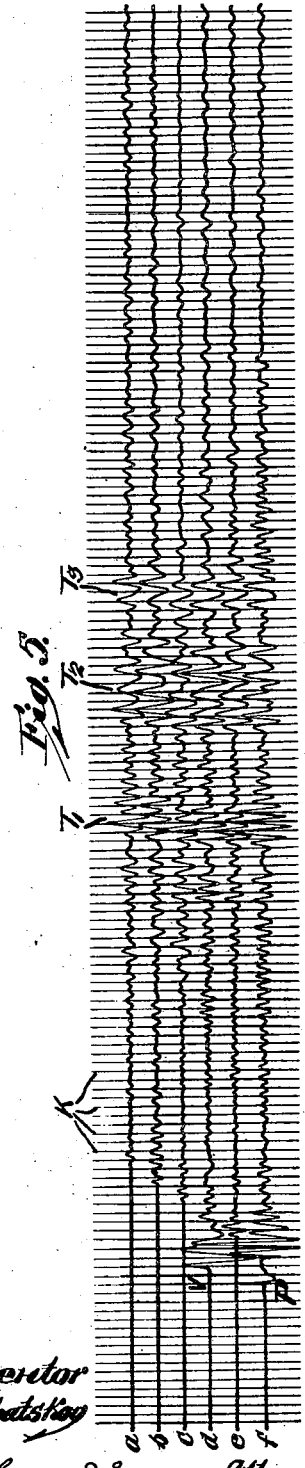
Inventor
Serge A. Scherbatskoy
Attorneys.

May 15, 1945.  S. A. SCHERBATSKOY  2,376,195
AMPLIFYING APPARATUS
Filed Sept. 15, 1936   6 Sheets-Sheet 2

May 15, 1945. S. A. SCHERBATSKOY 2,376,195
AMPLIFYING APPARATUS
Filed Sept. 15, 1936  6 Sheets-Sheet 3

Inventor
Serge A. Scherbatskoy
by Steell Gehan and Son
Attorneys.

Patented May 15, 1945

2,376,195

UNITED STATES PATENT OFFICE 2,376,195

AMPLIFYING APPARATUS

Serge A. Scherbatskoy, Tulsa, Okla., assignor to Engineering Laboratories, Inc., Tulsa, Okla., a corporation of Oklahoma Application September 15, 1936, Serial No. 100,841

1 Claim. (Cl. 177—352)

My invention relates to seismic recording systems and more particularly to systems used for seismological exploration, and offers a new and improved system for receiving and recording seismic vibrations and the like. The present invention is a development of the invention of William G. Green, described and claimed in application Serial No. 81,482, for Seismic survey system, filed May 23, 1936.

A purpose of my invention is to dispense with electrical circuit closing devices, mechanically operated variable resistances and the like for the control of the sensitivity of amplifiers in seismic recording, thereby avoiding any disturbing influences or poor or arcing contacts and the difficulties due to the uncertain and irregular operation of mechanical moving parts.

A further purpose is to make the control of the sensitivity of a seismic amplifier fully automatic and entirely electrical.

A further purpose is to control the operation of a seismic amplifier by purely electrical means, desirably by varying the voltage of a control element such as a grid of an electron tube in the amplifier, producing the variant voltage from a control system in accordance with the time constant of a control circuit.

A further purpose is to initiate the control of an amplifying device in a seismic exploring system by the disturbance produced by the explosion and to operate the control in response to the time constant of a circuit of constant impedance set up for the purpose.

A further purpose is to employ a gaseous medium which will become conductive upon reception of an impulse produced by the disturbance, and to initiate the control of an amplifying circuit when the gaseous medium becomes conductive.

A further purpose is to record all of the seismic vibrations to about the same scale, varying the amplification as required, without overloading the amplifiers, in accordance with an electrical impulse from an outside source of voltage. It is thus possible to read on a single seismogram clear signals of reflections from a number of subsurface beds.

A further purpose is to avoid repetitions of seismic explorations which have previously been necessitated by excessive or insufficient sensitivity of recording apparatus at a particular instant during the recording period following the seismic disturbance.

Further purposes appear in the specification and in the claim.

In the drawings I show few embodiments of the invention which have been chosen with a view to simplicity of operation and convenient illustration of the principles involved.

Figure 1 represents a seismographic record exhibiting some of the inconveniences of the prior art.

Figure 5 represents a seismographic record obtained with the device of the present invention.

Like numerals refer to like parts.

Figure 2:
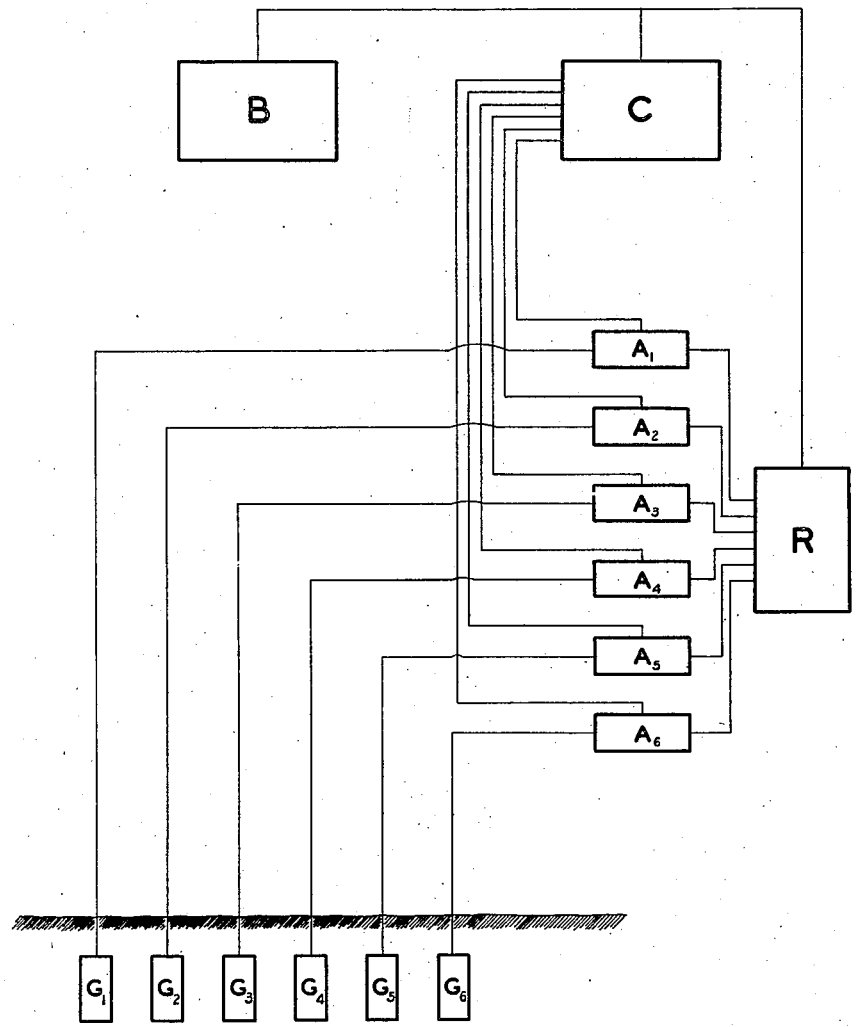
Figure 2 is a diagrammatic layout of a complete mechanism for practicing the invention and shows the arrangement and functions of its various constituents. In this figure electrical connections are for convenience indicated by single lines.

Seismological exploration consists in surveying the geological structure of the subsurface and determining the depth and slopes of subsurface strata with a view to locating formations favorable to the accumulation of oil and other valuable mineral deposits.

One of the methods of determining the depth of a subsurface formation consists in creating a disturbance in the earth and measuring the time interval required for a seismic wave to travel from the point of origin of the disturbance down to the subsurface formation being surveyed, and back to the surface of the earth after reflection from the subsurface formation. This time interval is measured directly on a graphical record which contains a registration of the initial instant in the travel of the waves which coincides with the time at which the disturbance is created, and a registration of the final instant of the arrival of the reflected waves at the surface of the earth.

Customarily the disturbance in the earth is produced by the detonation of an explosive charge or "shot" below the earth's surface. The resulting seismic waves are received by so-called geophones or seismometers which are usually placed at the surface of the earth and translate the earth vibrations into corresponding electrical currents. The electrical currents delivered by the geophones are amplified by electron tube amplifiers, a separate amplifier being used for each geophone. The amplified geophone currents are then introduced into an oscillograph recorder and made to produce an oscillographic record on a moving strip of photographic film or paper. The oscillograph includes an apparatus that registers on the record strip thin timing lines defining equal time intervals. Such a record is commonly called a seismogram and represents graphically the motions of the geophones on a graph of two coordinates: an abscissa representing the time variable and an ordinate representing the instantaneous current delivered by each geophone.

An example of a seismogram is shown on Figure 1. Referring now more particularly to this figure, the thin lines $k$ are the timing lines, the initial instant in the travel of the waves (the "time break") is recorded by the signal P, while the final instants corresponding to the arrivals of the reflected waves coming from the various subsurface structures are indicated by the signals $T_1$, $T_2$, $T_3$. The signal P is usually obtained by means of an electrical circuit which is disrupted by the explosive detonation and delivers a transient voltage in exact time coincidence with the instant at which the disturbance is created. The signals recorded by the traces $a, b, c, d, e, f$ represent the vibrations registered by six geophones located at appropriate distances one from another. The signal V located on the trace $d$ designates an impulse from a special geophone called a "vertical time" geophone. Its functioning is entirely independent of the rest of the geophones and amplifiers and its operation and use will not be described since it is well known in the art and has no direct relation to this invention.

It will be understood that the earth vibrations received by the geophones result from several waves travelling along different paths corresponding to direct travel, refraction, reflection, and diffraction, and it is apparent that the vibrations represented by the traces $a, b, c, d, e, f$ do not correspond to reflected energy only. As a matter of fact the waves which arrive earlier follow the direct and refracted paths, while the reflected waves usually travel longer distances and arrive later in a more attenuated form, thus becoming intermingled with refracted, direct and diffracted waves.

In order to determine the instant of arrival of the reflected waves it is essential to identify them on the record, i. e. to determine which of the vibrations recorded on the seismogram result from the reflected waves. The common methods used for this purpose require a very careful study of the records and considerable skill and experience, essential requisites for deriving proper and accurate information being clarity, precision and legibility of the records.

One of the ways of identifying the waves resulting from reflection is based upon the fact that the reflected waves arrive at the geophones from the lower subsurface layers along comparatively steep paths and in many instances strike all the geophones at substantially the same time. Consequently there occurs a certain similarity in the vibrations of the geophones at the time of the reflection. An inspection of Figure 1 shows that the waves $T_3$ are essentially alike in character in each of the traces $a, b, c, d, e, f$, and occur substantially at the same time.

Referring again to Figure 1, it is apparent that the part of the seismogram containing the signal $T_1$ can only be interpreted with very great difficulty. All early vibrations have extremely large amplitudes and go beyond the scale of the record. In Figure 1 all registrations earlier than $T_1$ are practically illegible. The information contained in these early vibrations, however, is usually of very great importance in the determination of the location and contour of the sursurface strata being investigated.

A main cause of these shortcomings and disadvantages of the prior art lies in the fact that the recording apparatus was not capable of recording the wide range of amplitudes encountered.

An additional cause for many inconveniences and disadvantages of the prior art is that the recording means is overloaded during part of the recording operation by oscillations which are too strong for the safe and satisfactory operation of the instrument.

Previous to this invention it has been frequently necessary to create several distinct seismic waves of different intensities and to produce several seismograph records, each representing with the greatest legibility and precision a specific wave coming from a specific subsurface formation. This was accomplished by detonating explosive charges of different sizes; a small charge being used for the surveying of the shallow formations and larger charges being used for producing the more intense seismic waves required for the surveying of the deeper formations. Such a procedure was necessary mainly because of the inability of the seismograph to record clearly the range of amplitudes impressed upon it. If the seismograph were adjusted to record with a suitable amplitude the stronger waves coming from shallow formations, it recorded the weaker waves coming from the deeper formations with too small an amplitude and with insufficient clarity; on the other hand, if the seismograph were adjusted to record with the desired amplitude the weaker waves it recorded the stronger waves with too large an amplitude, which exceeded the scale of the instrument and sometimes damaged the recording instrument.

For various reasons well understood by those skilled in the art, it has been considered advantageous to place the geophones relatively close to the center of the disturbance. This, however, was not possible on account of the large magnitude of the first waves as compared with the later waves.

In the past several attempts have been made to obviate these inconveniences and to provide a controlling means which will vary the sensitivity of the recording means in such a manner that the successive waves produced on the record would be of the same order of magnitude.

These attempts have been made with a view to providing a clear and legible record and to protecting the recording means from overload. The apparatus provided in the past for this purpose consisted of movable control elements such as variable resistances, rheostats, switches, or attenuators. See Green application above referred to; Born U. S. Patent No. 2,003,780, for Seismic surveying, granted June 4, 1935. These movable elements were driven and controlled by mechanical means such as spring motors or electric motors, and were made to perform the desired mechanical movements which in turn operated on the control elements. The variation of the magnitude of the control elements performed the desired control action.

The inconveniences of these prior arrangements lie in the fact that the mechanical nature of the controlling action is complicated and unreliable in operation. The mechanical motion of the controlling element is necessarily accompanied by vibration and contact noise. The controlling mechanism has generally been put into operation by some sort of electric synchronizing signal produced at the instant at which the seismic waves were created. This electric signal produced the desired initiating action in the mechanical controlling mechanism. The initiating action was accomplished by electro-mechanical devices such as relays, solenoids, and the like which produce arcing and magnetic disturbances, the effect of which it is not always easy to eliminate.

My invention obviates the inconveniences and and disadvantages of a mechanically actuated and mechanically functioning controlling mechanism and provides a device which is simple and reliable in operation.

By my invention I am able to produce a clear, precise and legible seismographic record. I can combine in a single seismographic record clear signals of reflections from a number of subsurface beds. The scale of each recorded signal is controlled according to a predetermined program. The sensitivity of the recording means is varied automatically to counteract the effect of the decay in magnitude of the successive wave trains.

By my invention overload of the seimographic recording system is made impossible, so that the geophones may be placed comparatively close to the center of the disturbance. The magnitude of the first incoming waves is decreased and the magnitude of the later incoming waves is increased.

The instants of the arrivals of the successive reflections may be clearly distinguished. By virtue of the control of the sensitivity of the seismic recorder, a reflection from a certain depth is recorded by a signal of a predetermined amplitude. The successive wave trains resulting from direct travel, and from travel according to refracted, reflected and diffracted paths are of the same order of magnitude and can be examined with equal precision.

The recording of the seismic waves according to my invention is fully automatic. The control over the sensitivity of the recording apparatus is accomplished entirely by electrical means, as will be more fully explained, thus eliminating mechanical devices with the corresponding disadvantages.

The invention involves both the structure and the process subjects matter.

While the invention is applicable to seismic recording generally, and to the control of amplifiers of various sorts, it is believed that the best embodiments of the invention are in seismographic geophysical prospecting equipment.

My invention when used for this purpose consists mainly of a seismic equipment in which the earth vibrations are converted into electrical vibrations, the latter are amplified by means of electronic tubes and means are provided for controlling the amplification of the tubes so as to counterbalance the decay in magnitude of the incoming waves and consequently give a record in which the successive wave trains are of the same order of magnitude.

In order to illustrate the advantages of my invention I have shown two seismograms in Figures 1 and 5. The seismogram of Figure 1 (which has been referred to previously) represents vibrations produced in a given locality by the detonation of ¾ pound of dynamite 70 feet below the earth's surface. The record was obtained by means of the apparatus which was commonly used prior to my invention. Figure 5 represents a record under the same conditions (i. e. ¾ pound of dynamite, 70 feet below the earth's surface and at the same spot as that of Figure 1). Since the conditions existing during the records of Figures 1 and 5 were made as nearly identical as practical, similar signals have been obtained, i. e. the various refracted, reflected and direct waves have followed substantially similar paths in both records and have produced the same motions of the geophones. For example there are corresponding reflections $T_3$ on Figures 1 and 5.

From the comparison of the records of Figures 1 and 5, it is evident that the signals of Figure 5 are clearer, more legible and more accurate. Thus for instance the signal $T_1$ in Figure 5 indicates a reflection since the corresponding traces $a$, $b$, $c$, $d$, $e$, $f$ are essentially alike in character, whereas in Figure 1 the reflection designated by $T_1$ can be identified only with very great difficulty.

In order to obtain a record as shown on Figure 5, the amplifying tubes are arranged in a circuit which is so constructed that its amplification can be varied by varying the potential applied to one or several of the tube elements. This potential control is derived from an appropriate controlling mechanism which contains among other elements a charged condenser and a gas filled tube. At the instant of the dynamite explosion, the gas filled tube is made to become conductive and this enables the condenser to discharge, causing a corresponding variation of the control potential.

Referring now particularly to Figure 2, the rectangular blocks represent diagrammatically the various system parts that will be described in detail when reference is made to the other figures. The lines connecting these blocks represent means for transferring electrical energy from one part to another.

The geophones $G_1$, $G_2$, $G_3$, $G_4$, $G_5$, $G_6$, are used for converting the earth vibrations into corresponding electrical vibrations. They may be of the Galitzin type in which the motion of the earth causes relative motion between a coil of wire and a magnetic field, thus producing an electromotive force which is proportional to the instantaneous velocity of the earth displacement.

$A_1$, $A_2$, $A_3$, $A_4$, $A_5$, $A_6$ represent electron tube amplifiers which individually amplify the geophone outputs and send them to the recording instrument R which is arranged so as to permit the separate recordings of the electric currents corresponding to each geophone. The recording instrument R contains a galvanometer to respond to the amplified current delivered by each amplifier $A_1$, $A_2$, $A_3$, $A_4$, $A_5$, $A_6$ and cause a beam of light to oscillate back and forth and produce a photographic record. The moving film is driven at a uniform speed by a rotating drum or other device and produces a record of the motions of each geophone $G_1$, $G_2$, $G_3$, $G_4$, $G_5$, $G_6$ and of the time signal delivered by the "time break" mechanism B. B represents an electrical circuit which is interrupted by the dynamite explosion and produces a transient voltage which is recorded in R by means of a galvanometer. Such a system is well known in the art and is usually referred to as a "time break" circuit. The voltage produced in the circuit B is also made to operate on the controlling device C and to cause the controlling device to operate at the instant of the occurrence of the dynamite explosion.

The controlling device C consists of a circuit arrangement which varies individually the amplification of the amplifiers $A_1$, $A_2$, $A_3$, $A_4$, $A_5$, $A_6$ in such a manner as to tend to counteract the general dying out of the earth vibrations. If, for instance, the vibrations received by an amplifier decay according to a law that can be roughly represented by a negative exponential, then the amplification of this amplifier is made to increase substantially according to the reciprocal of the same exponential.

The construction of the pieces of apparatus that perform the various described functions, namely the geophones $G_1$, $G_2$, $G_3$, $G_4$, $G_5$, $G_6$, the time break mechanism B and the recording instrument R is well known in the art and their respective wiring diagrams are not shown since they may be those of the prior art and the present invention is not concerned with their detail. The novel features of this invention include the control mechanism C and the amplifying arrangements $A_1$, $A_2$, $A_3$, $A_4$, $A_5$, $A_6$, which are represented by means of the wiring diagrams of Figures 4 and 3 respectively.

Figures 3, 3A:
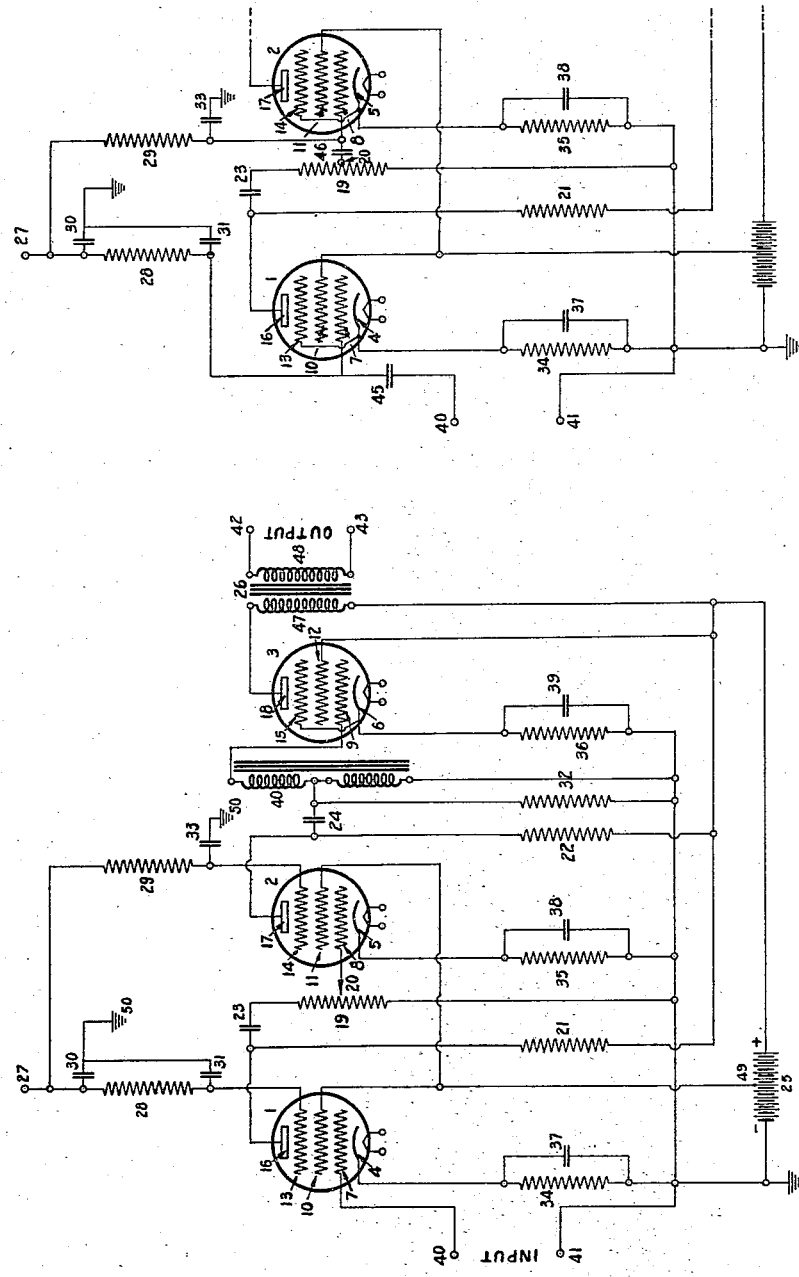
Figure 3 shows schematically the arrangement used for amplifying the output of the geophone.
Figure 3a shows a modified fragment of Figure 3.

Figure 3 shows one amplifier $A_1$, $A_2$, $A_3$, $A_4$, $A_5$ or $A_6$. The preferred form of amplifier includes three five-electrode tubes 1, 2, 3, commonly designated as pentodes. They are provided with indirectly heated cathodes 4, 5, 6 (heaters are indicated but heater circuits are not shown), control grids 7, 8, 9, screen grids 10, 11, 12, suppressor grids 13, 14, 15, and plates 16, 17, 18, respectively. Self biasing resistances 34, 35, 36, shunted by capacitances 37, 38, 39, are provided in order to maintain a negative grid bias in the tubes 1, 2, and 3, respectively. The output voltage of a geophone is applied to the control grid 7 of the tube 1 through the input terminals 40 and 41.

The tubes 1 and 2 are coupled by means of the resistance 21, the condenser 23 and the resistance 19. The resistance 19 is provided with a movable contact 20 which makes it possible to supply the control grid 8 of the tube 2 with all of the voltages developed across the resistance 19 or any fraction thereof as desired. Such a "volume control" method is well known in the art. Tube 2 is coupled to tube 3 by means of the resistor 22, the condenser 24, the resistor 32 and the transformer 46.

A battery 25 is provided to supply plate voltage for the tubes 1, 2, 3, and screen voltage for the tube 3. An intermediate point 49 of the battery 25 is connected to the screen grids 10 and 11 of the tubes 1 and 2, respectively, thus maintaining their voltage at an appropriate positive potential. A transformer 26 is connected in the last stage of the amplifying arrangement. The primary 47 of this transformer is inserted in the plate circuit of the tube 3 and the secondary 46 delivers the current to the galvanometer of the recording instrument through the output terminals 42 and 43. In tube 3, the suppressor grid 15 is connected to the cathode 6.

The suppressor grid 13 of the tube 1 is connected through the resistance 28 to the control terminal 27 and also to one side of the condenser 31, the other side of which is grounded. Similarly the suppressor grid 14 is connected through the resistance 29 to the control terminal 27, and also to one side of the condenser 33, the other side of which is grounded. The control terminal 27, besides being connected to one side of the resistors 28 and 29, is also connected to one side of the condenser 30, the other side of the condenser 30 being connected to ground.

The operation of this arrangement may be explained as follows:

If a charge of dynamite or other explosive is detonated, earth waves are propagated and arrive at the geophone in several succeeding impulses resulting from direct travel, refractions and reflections. As a result of these impulses there appears in the output of the geophone a certain voltage which shall be designated as $e_g$ and which is applied to the grid of the tube 1. The voltage $e_g$ consists of several wave trains which decrease rapidly in strength in a manner similar to that shown in the record of Figure 1. As has been pointed out above, such a rapid decay of magnitude is undesirable.

It is advantageous to obtain a record in which the decrease in the magnitude of the wave trains will be counteracted by a receiving system which adjusts itself to produce a record of substantially constant magnitude. By changing the amplification according to a function which is substantially the reciprocal of the function expressing the decay of the magnitude of the succeeding wave trains, such a record can be produced.

Figure 6:
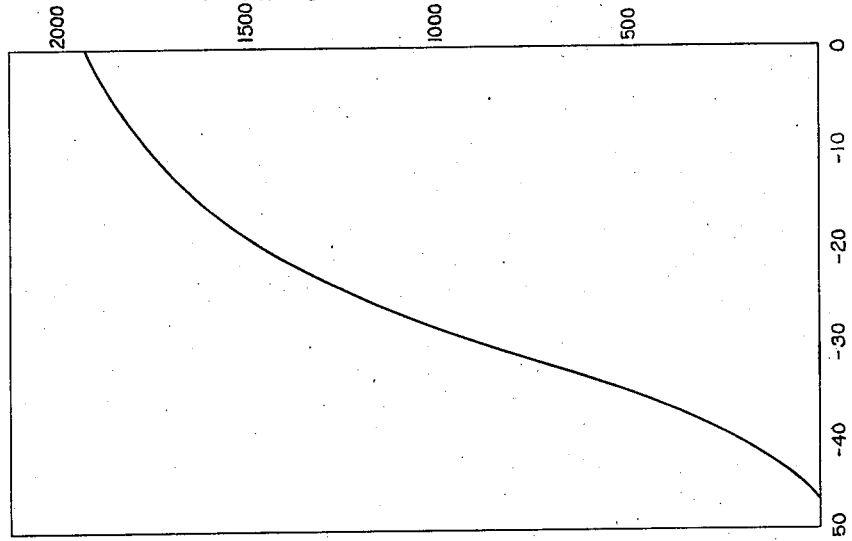
Figure 6 shows diagrammatically the relation between the mutual conductance and the suppressor grid voltage in a pentode.

This is done by making use of the property of pentode tubes that the mutual conductance depends upon the voltage of a grid capable of controlling the amplification, the suppressor grid. Figure 6 shows diagrammatically the dependence existing between the mutual conductance and the suppressor grid voltage in a pentode. The abscissae represent suppressor grid voltages in volts, while the ordinates correspond to mutual conductances expressed in micromhos. Referring now more particularly to Figure 6, it is seen that, by maintaining initially an appropriate negative potential on the suppressor grid, and decreasing its absolute value (that is, rendering it less negative) the amplification of the tube (mutual conductance) is made to increase. In the arrangement of Figure 3, the tubes 1 and 2 are both connected so that their mutual conductances are varied. By applying a potential to the control terminal 27, the suppressor grids 13 and 14 of the tubes 1 and 2 are both acted upon.

As has been pointed out above, it is necessary to have a relatively small amplification for the first incoming wave, as it is of great intensity. The amplification should increase with time, in order to counteract the general effect of decay in amplitude to which the waves are subjected. Accordingly, the voltage on the suppressor grids of the tubes 1 and 2 is made to be initially negative, and its absolute value is initially large enough to cause a relatively small amplification of the amplifier. However, at the instant of the dynamite explosion, the mechanism controlling the potential of the suppressor grids becomes energized and causes the suppressor grid voltage to decrease in absolute value, thus producing larger amplification and making possible greater magnification for the weaker wave impulses which arrive at the control grid 7 of the tube 1 at later instants.

It has been found, however, that the variation of the suppressor grid voltage produces two different effects. The first effect consists in the variation of the amplification of the tube, so that the voltage applied to the control grid of the tube becomes magnified to an extent dependent upon the suppressor voltage. The second effect results from the fact that the suppressor grid possesses similar properties to the control grid. Consequently the varying potential applied to the suppressor grid is amplified, and appears in the output of the tube together with the amplified voltage derived from the control grid.

This can be shown as follows:

Referring to Figure 3, let $i_p$ be the plate current of the tube 1, let $e_g$ be the signal voltages derived from the geophone and applied across the input terminals 40 and 41 and let $e_s$ be the voltage applied to the suppressor grid 13. The relation between $i_p$, $e_g$, and $e_s$ can be expressed symbolically in the following form:

$$i_p = f(e_g, e_s) \quad (1)$$

The form of this function is determined by the constants of the circuit which constitutes the first stage of the amplifier, and depends among other things upon the value of the self-biasing resistance 34. The value of the partial derivative of $i_p$ with respect to $e_g$ is approximately proportional to the amplification of the above circuit.

Figure 7:
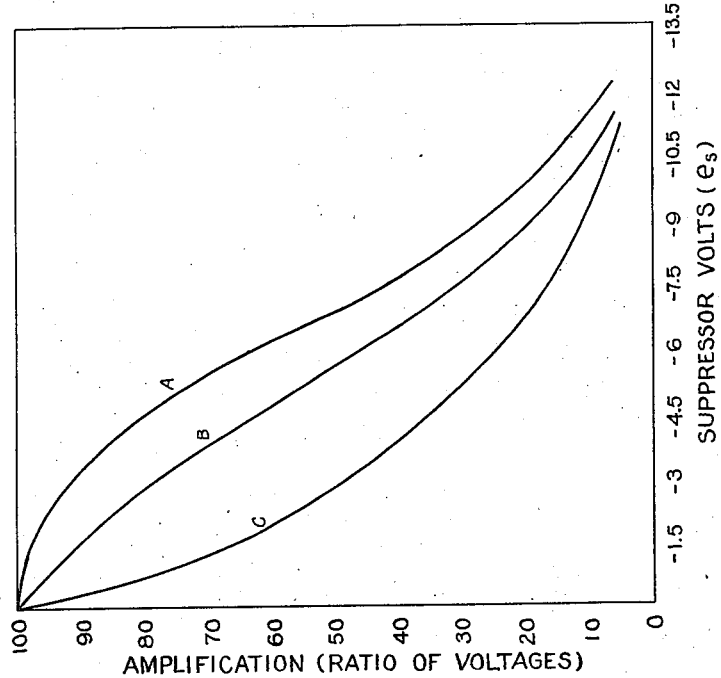
Figure 7 shows diagrammatically the relation between the amplification and suppressor grid voltage in a self-biasing amplifying circuit for various values of the self-biasing resistance.

Figure 7 illustrates graphically the relation which has been obtained between amplification and suppressor voltage for various values of self-biasing resistances. The abscissas represent the suppressor voltage in volts, the ordinates correspond to the amplification represented as a ratio of the voltage across the whole resistance 19 (Figure 3) to the voltage across the terminals 40 and 41. Curve A (Figure 7) corresponds to an amplifying arrangement in which the value of the self-biasing resistor has been chosen to be 7500 ohms, curve B corresponds to a value of 5000 ohms and curve C to a value of 2500 ohms.

The change in the plate current, that is, in the output, is expressed by the relation:

$$di_p = \frac{\delta i_p}{\delta e_g} de_g + \frac{\delta i_p}{\delta e_s} de_s = F(e_s) de_g + \frac{\delta i_p}{\delta e_s} de_s \quad (2)$$

In this expression $de_g$ represents a differential of the signal voltage derived from the earth vibrations. The term $$\frac{\delta i_p}{\delta e_g} de_g$$

corresponds to the alternating current component in the plate circuit of tube 1. This alternating current component produces an alternating voltage drop across the resistance 21 which is equal to:

$$R_{21} \left( \frac{\delta i_p}{\delta e_g} \right)_{e_s=0} \cdot de_g \quad (3)$$

where $R_{21}$ is the ohmic resistance of the resistor 21. The condenser 23 and the resistor 19 are so proportioned that this alternating voltage component is reproduced mainly across the resistor 19. The resistor 19 is provided with a sliding contact 20 which is connected to the grid 8 of the tube 2.

On the other hand, the control voltage $e_s$ applied to the suppressor grid 13 is not alternating but rather unidirectional during the substantial part of the time interval under consideration. Consequently the component $$\frac{\delta i_p}{\delta e_s} de_s$$

contributed by the suppressor voltage to the plate current of the tube 1 varies relatively slowly with time. It passes through the resistor 21 and does not contribute very much to the grid voltage of the tube 2 because the condenser 23 offers a high impedance to this slowly varying voltage. It would be desirable however to eliminate this unidirectional component entirely, and to obtain in the plate circuit of the tube 2 a voltage resulting entirely from the alternating component applied to the grid 7. This is done by connecting the suppressor grid 14 of the tube 2 to the terminal 27 through the resistor 29 so that there are two opposite unidirectional voltages applied to the tube 2. One of them is applied directly to the suppressor grid 14 from the terminal 27 through the resistor 29, and the other is one of the components of the voltage applied to the control grid 8 from the plate circuit of the preceding tube 1. These two unidirectional voltages vary oppositely with time and it is possible to so dimension them that their effects on the plate current of the tube 2 will be equal and opposite and neutralize each other. Consequently, because of this cancellation of effects, substantially only the alternating component of the grid voltage becomes amplified in the second stage.

If, for instance, the variation of the grid voltage is caused by a damped oscillation $e^{-pt} \sin \phi t$, then the term $F(e_s) e^{-pt} \sin \phi t$ representing the alternating component of the output of the tube 1 will have a substantially constant amplitude if $F(e_s)$ varies exponentially as $e^{pt}$. Assuming for instance that the curves of Figure 7 showing the relation between the amplification and the suppressor voltage to be rectilinear, it is seen that an exponential decay of the absolute value of the suppressor voltage would cause an increase of the amplification according to an exponential so that the output of the amplifier would not vary.

In order to eliminate a direct influence of the suppressor voltage of the tube 1 on the suppressor of the tube 2 and also in order to prevent a retroactive action of the suppressor voltage of the tube 2 upon the suppressor of the tube 1, the resistors 28 and 29 are introduced, and capacitors 30, 31, 33 are provided in order to prevent any such mutual coupling of the suppressor 13 and the suppressor 14 through the control point 27.

Figure 4:
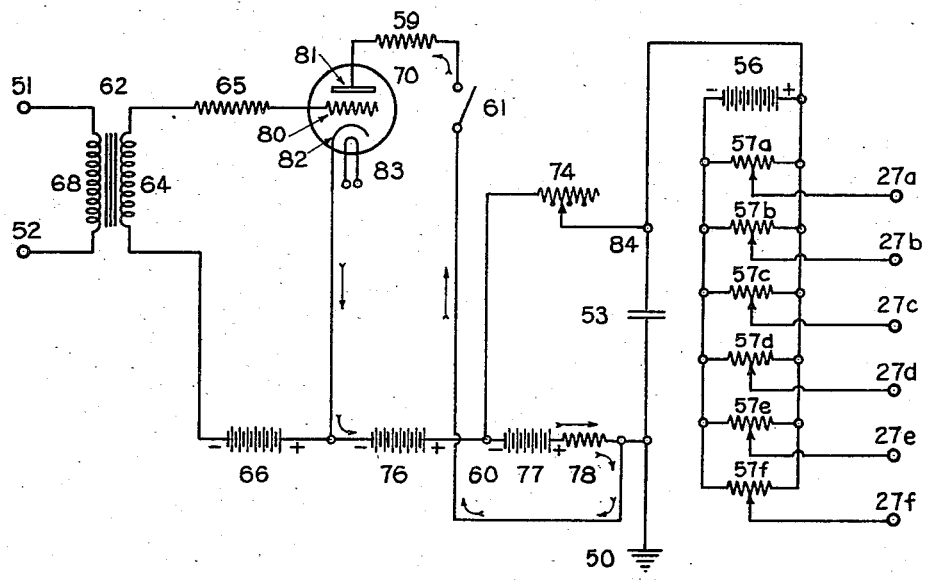
Figure 4 represents schematically the mechanism for controlling the amplifying arrangement shown on Figure 3.

The equipment controlling the suppressor voltage referred to in the above description is shown schematically in Figure 4, and its functional relation with regard to the other parts of the seismic equipment is shown at C in Figure 2. Referring now more particularly to Figure 4, the output terminals of this controlling device consist of the ground connection 50 (Figures 3 and 4) and leads 27a, 27b, 27c, 27d, 27e, 27f to the terminals 27 of the various amplifiers. The input terminals consist of the leads 51 and 52 which connect to the primary 68 of the input transformer 62. The secondary 64 of the input transformer 62 connects on one side to the resistor 65 and on the other side to the negative side of the battery 66. The remaining side of the resistor 65 connects to the grid 80 of the gas filled tube 70, while the positive side of the battery 66 connects to the cathode 82 of the tube 70. The cathode 82 also connects to the negative side of the battery 76. The cathode 82 is indirectly heated by a heater 83 whose circuit is not shown.

The plate 81 of the tube 70 connects to one side of the resistor 59, the other side of which connects to the switch 61 which in turn connects to the ground 50. The positive side of the battery 76 connects to the point 60 and this is also connected to the negative side of the battery 77. The positive side of the battery 77 connects to one side of the resistor 78, the other side of which is connected to the ground 50. The point 60 is also connected to one side of the variable resistor 74, the other side of which is connected to the point 84. The capacitor 53 is connected on one side to the ground 60 and on the other side to the point 84. The resistors 57a, 57b, 57c, 57d, 57e, 57f are connected in parallel and connected across the battery 56, which has the polarity indicated on the drawings. The resistors 57a, 57b, 57c, 57d, 57e, 57f are each provided with a movable tap which connects with the respective lead 27a, 27b, 27c, 27d, 27e or 27f, which constitutes part of the output circuit. The positive side of the battery 56 besides connecting to the resistors 57a, 57b, 57c, 57d, 57e, 57f, also connects to the point 84.

The gas filled tube 70 is of the discontinuous discharge type in which the anode current can be started by applying a voltage impulse into the grid circuit and can be interrupted by depressing the anode voltage below a critical value.

The operation of this device can be explained as follows:

Previous to the explosion of the dynamite, the gaseous medium in the tube 70 is nonconductive and its grid is negatively biased by the battery 66. The capacitor 53 is charged by the battery 77 and there is no current flowing through the resistors 59, 78. At the instant of the dynamite explosion, the "time break" mechanism referred to in the above description (designated as B in the functional diagram of Figure 2) impresses across the input terminals 51, 52 a momentary transient voltage. By means of the transformer 62 and the resistor 65 this voltage surge is impressed on the grid 80 of the tube 70 in the positive direction. This surge of voltage overcomes the negative grid bias supplied by the battery 66 to the grid 80 of the tube 70, the gaseous medium in the tube 70 is rendered conductive, a parameter of the plate circuit is changed, and the plate current flows in the circuit consisting of cathode 82, battery 76, battery 77, resistor 78, switch 61 (in closed position), resistor 59 and plate 81 in the direction indicated by the arrows. This current produces a voltage drop across the resistor 78, which is also in the circuit consisting of condenser 53, resistor 74, point 60, battery 77 and resistor 78.

The said voltage drop across the resistor 78 has a polarity opposite to the polarity of the battery 77. The total voltage in the circuit becomes reduced and the condenser 53 discharges through the resistor 74. This discharge, however, does not take place instantaneously, for the rate of decrease of the voltage across the capacitor 53 depends upon the value of the time constant of the circuit. This time constant can be conveniently modified by changing the tap contacts of the resistor 74.

Previous to the dynamite explosion the output terminals 27a, 27b, 27c, 27d, 27e, 27f gave negative potentials with respect to the potential of the ground 50. These potentials are due to the sum of the voltage across the condenser 53 and the voltage across the voltage-dividing resistors 57a, 57b, 57c, 57d, 57e, 57f, and they are applied to the suppressor grids of the tubes of Figure 3 in a manner that has been explained previously. The potentials of the terminals 27a, 27b, 27c, 27d, 27e, 27f, can be individually controlled by means of the sliding contacts which are capable of adjustment on the resistors 57a, 57b, 57c, 57d, 57e, 57f.

Following the detonation of the dynamite, the capacitor 53 discharges, and consequently each of the individual potentials of the terminals 27a, 27b, 27c, 27d, 27e, 27f decreases in absolute magnitude, thus causing a larger magnification of the corresponding amplifiers as explained in connection with Figure 6.

Figure 4A:
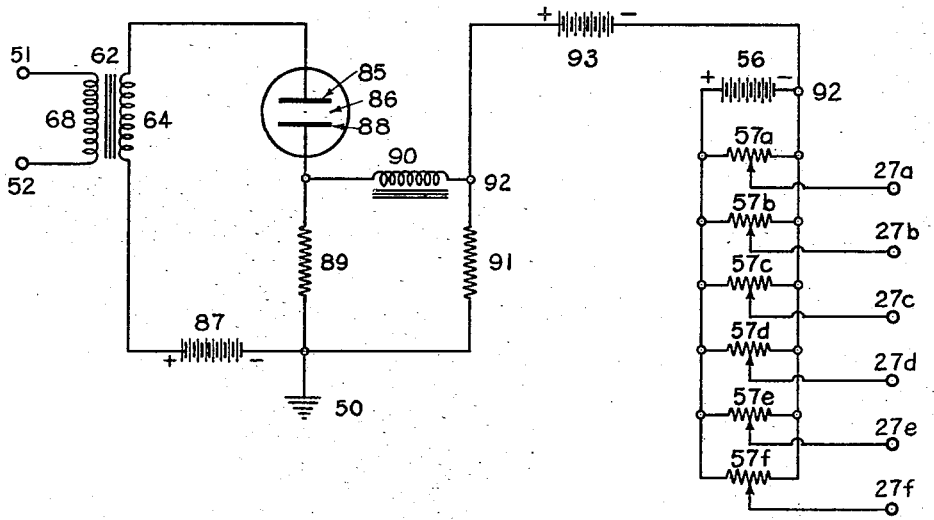
Figure 4a represents schematically a modified mechanism for controlling the amplifying arrangement shown on Figure 3.

The control of the amplification may also be effected by means of an arrangement which has been represented diagrammatically in Figure 4a. The elements which are common to Figure 4 and Figure 4a have been designated by the same numerals while elements which correspond to modified features have been represented by different numerals in Figure 4a.

Referring now more particularly to Figure 4a, the secondary 64 of the input transformer 62 connects on one side to the electrode 85 of a gas-filled tube 86 and on the other side to the positive terminal of the battery 87. The negative terminal of the battery 87 is connected to the ground 50 and is also connected to the electrode 88 of the gas-filled tube 86 through a path including a resistor 89. The resistor 89 is inserted across a circuit consisting of an inductor 90 in series with a resistor 91. The inductor 90 has a common connection 92 with the resistor 91 and connects to the negative terminal of the battery 56 by means of a path which includes the battery 93.

Previous to the explosion of the dynamite, the gaseous medium in the tube 86 is nonconductive and the voltage of the battery 87 is below the disruptive potential of the tube 86. At the instant of the dynamite explosion the "time break" mecehanism impresses across the input terminals 51 and 52 a momentary transient voltage. By means of the transformer 62 this voltage surge is impressed across the plates 85 and 88 of the gas-filled tube 86 and disrupts the gaseous medium thus making the tube conductive. Consequently a current delivered by the battery 87 starts to flow suddenly through the path consisting of the winding 64 in series with the gas-filled tube 86 and in series with the resistor 89. A substantially constant voltage drop suddenly appears across the terminals of the resistor 89 and is impressed across the circuit consisting of the inductor 90 in series with the resistor 91. The said voltage drop produces a current which rises gradually with a rate which depends upon the time constant of the circuit and causes a voltage drop across the resistor 91 such that the polarity of the terminal 92 becomes positive with respect to ground and increases gradually in this direction.

Previous to the dynamite explosion the output terminals 27a, 27b, 27c, 27d, 27e, 27f, have negative potentials with respect to the potential of the ground 50. These potentials are due to the sum of the voltage of the battery 93 and the voltage across the voltage dividing resistors 57a, 57b, 57c, 57d, 57e, 57f and they are applied to the suppressor grids of the tubes of Figure 3. Following the detonation of the dynamite the potential of the terminal 92 becomes positive and steadily increases with time thus bucking the effect of the negative voltage of the battery 93. Consequently each of the individual potentials of the terminals 27a, 27b, 27c, 27d, 27e, 27f, start from an appropriate initial negative value and decrease in absolute magnitude, thus causing a larger magnification of the corresponding amplifiers as explained in connection with Figure 6.

With the aid of the detailed description given above, any person skilled in the art can readily understand the operation of the invention. It is of course evident that no attempt has been made to plot curves showing the effects of the variation of the values of every circuit parameter. The curves in Figure 7 showing the effects of a variation of the value of the self-biasing resistor are shown because the self-biasing resistor value is somewhat more critical than the values of the other resistors and other parameters shown.

While the description given above refers to the controlling of a seismograph amplifier which uses pentodes, it is evident that this invention is not limited to the controlling of such amplifiers only. The mutual conductance of electronic tubes can be varied and controlled by a number of other influences besides the variation of the suppressor grid voltage. It is, for example, sometimes convenient to use the effect upon mutual conductance of the variation in control grid-voltage. This is especially advantageous in socalled variable-mu tubes, but is also applicable in other tubes. Curves showing the effect of control grid voltage on the mutual conductance have been plotted and are published by the manufacturers of electron tubes (see R. C. A. Tube Handbook, published by the R. C. A. Radiotron Division, R. C. A. Manufacturing Company, Inc., Harrison, N. J., tube 57, sheet 92C-4476, diagram 92S-5266, September 16, 1935, and tube 58, sheet 92S-5434R1, August 20, 1935).

This method of amplification by varying the grid voltage is illustrated schematically on Figure 3a representing a fragment of Figure 3 in which certain features have been modified. Accordingly, in Figure 3a the control terminal 27 is connected to the grid 7 of the tube 1 by means of a path which includes the resistor 28 and the said control terminal 27 is also connected to the grid 8 of the tube 2 by means of a path which includes the resistor 29. A capacitor 45 is inserted between the terminal 40 and the grid 7 of the tube 1 and a capacitor 46 is inserted between the terminal 20 and the grid 8 of the tube 2. The capacitor 45 is inserted for the purpose of preventing the control voltage applied between the terminals 27 and 41 from having a conductive path consisting of the resistor 28 and of the impedance of the geophone as viewed between the terminals 40 and 41. The capacitor 46 is inserted with the purpose of preventing the said control voltage from finding a low impedance path consisting of the resistor 29 and of a portion of the resistor 19 between the terminals 20 and 41. The suppressor grid 13 of the tube 1 is directly connected to the cathode 4 of the tube 1 and the suppressor grid 14 of the tube 2 is directly connected to the cathode 5 of the tube 2. The remaining elements of the fragmentary drawing of Figure 3a have been denoted by the same numerals as the corresponding elements of Figure 3. The operation of the arrangement shown in Figure 3a is analogous to the arrangement of Figure 3 with the exception that in Figure 3a the mutual conductances of the pentodes 1 and 2 are varied by applying the control voltage from the terminal 27 to the grids 7 and 8 respectively, while in Figure 3, the mutual conductances of the pentodes 1 and 2 are varied by applying the control voltage from the terminal 27 to the suppressor grids 13 and 14 respectively.

The variation of screen grid voltage also has an effect on the mutual conductance and it is sometimes convenient to use the screen voltage for control purposes. Curves showing the effect of the variation in screen grid potential upon the mutual conductance have also been published (see R. C. A. Tube Handbook published by the R. C. A. Radiotron Division, R. C. A. Manufacturing Company, Inc., Harrison, N. J., tube 24-A, sheet 92C-4467, diagram 92S-574R4, October 23, 1935, and tube type 58, sheet 92S-5451, February 26, 1934).

The changing of the plate potential will also have an effect upon the mutual conductance. Curves showing this relation are also published (see R. C. A. Tube Handbook published by the R. C. A. Radiotron Division, R. C. A. Manufacturing Company, Inc., Harrison, N. J., tube type 26, sheet 92S-559R2, July 1, 1935).

In fact a deviation from normal of any of the potentials sppplied to the tube elements will cause a change in the mutual conductance of the tube. The "normal" element potentials usually refer to the potentials that produce optimum mutual conductance; and any deviation from these values of potentials will usually produce a reduction in mutual conductance. Practically all these effects have been tried and used in the past; even variation in filament voltage has been used for volume control purposes.

With reference to this invention, it is possible and sometimes desirable to use some of the control properties described above. The present invention is therefore not limited to the control of pentode amplifiers but includes the control of triodes, tetrodes, and other types of electronic tubes. It has been preferred to illustrate an embodiment in which pentode tubes are used merely because of its convenience, satisfaction in operation and clear illustration of the principles involved.

Figure 8:
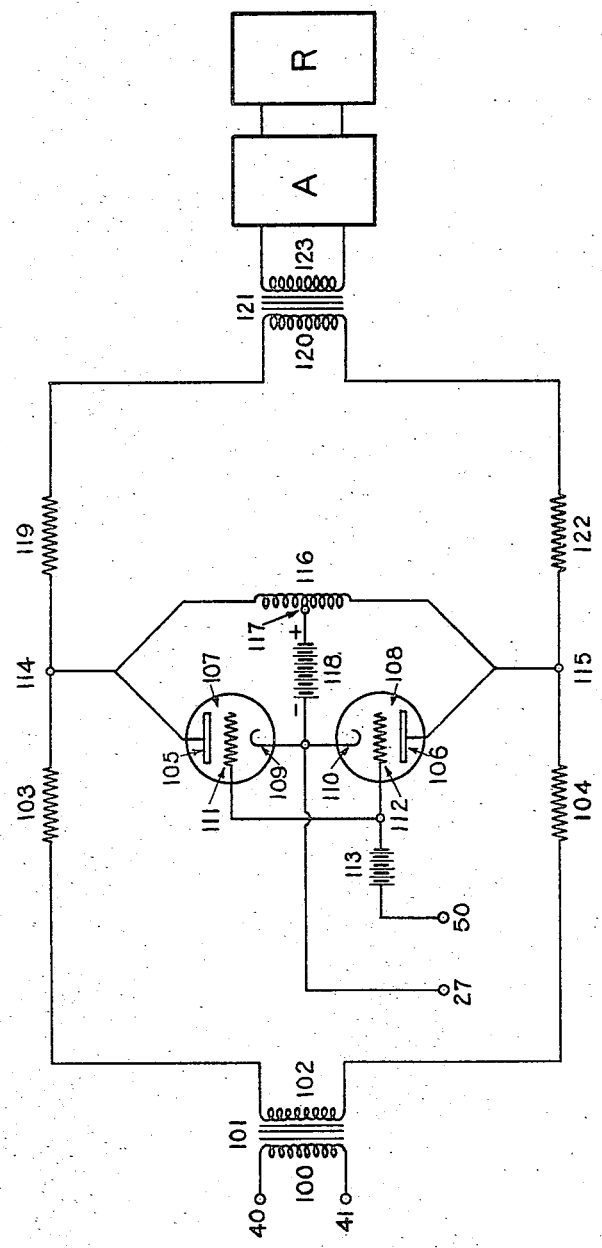
Figure 8 shows schematically another arrangement used for amplifying the output of the geophone.

Another embodiment of my invention is shown diagrammatically in Figure 8. Referring now more particularly to this figure, the numerals 40 and 41 designate the output terminals of a geophone which is not shown in the figure.

Across the terminals 40 and 41 is inserted the primary winding 100 of a transformer 101, the secondary winding of which is 102 and is connected through the resistors 103 and 104 to the plates 105 and 106 of the triodes 107 and 108 respectively. The triodes 107 and 108 are also provided with cathodes 109 and 110 respectively and with grids 111 and 112 respectively.

The cathodes 109 and 110 are connected with the terminal 27 and the grids 111 and 112 are both connected to the negative terminal of the battery 113, the positive terminal of which is connected to the terminal 50. The plates 105 and 106 are connected to points 114 and 115 respectively.

Across the points 114 and 115 is connected the choke coil 116 which is provided with a centertap 117, which is connected to the positive side of the plate battery 118, the negative side of which is connected to the cathodes 109 and 110 and to the terminal 27. Across the points 114 and 115 is connected the output circuit consisting of a resistor 119, the primary 120 of a transformer 121 and a resistor 122. The secondary 123 of the transformer 121 is connected to a convenient electronic amplifier designated by a rectangle A, which in turn is connected to the recording instrument designated by a rectangle R.

The operation of this device can briefly be described as follows:

The output of the geophone is applied across the terminals 40 and 41 and transmitted through the transformer 101 to the resistors 103 and 104 and impressed across a five-element balanced attenuator made up of the series arms 103, 104, 119, 122 and the shunt arm between the points 114 and 115. This shunt arm consists of the choke coil 116 and the two plate impedances of the tubes 107 and 108 in series. The impedance of the choke coil 116 is made large as compared to the tube plate impedances and its effect on the magnitude of the shunt arm is negligible, the choke coil 116 being provided only for a low DC resistance plate circuit for the tubes 107 and 108. The shunt arm of the attenuator is therefore mainly the two tube plate impedances in series.

Initially the terminal 27 is maintained negative as compared to 66 by the control apparatus C, and the negative voltage impressed on the cathodes 109 and 110 counteracts the negative grid bias supplied by the battery 113 so that the tubes 106 and 107 have substantially zero or very small grid bias; under these conditions the plate impedance is minimum and the value of the shunt arm between 114 and 115 is also minimum and the attenuation of the network is large.

As the control apparatus C gradually reduces the negative voltage impressed on the terminal 27 and on the cathodes 109 and 110, the effective grid bias on the tubes 107 and 108 becomes gradually reduced, the plate impedances of the tubes gradually increase and the value of the shunt arm between the points 114 and 115 increases correspondingly and the attenuation of the network decreases.

It is, therefore, apparent that the purpose of the arrangement is to attenuate the input oscillations in such a manner that the degree of attenuation is larger for the early wave trains and becomes smaller for the succeeding wave trains which are of smaller amplitude. Thus the voltage obtained between the terminals 114 and 115 is composed of successive wave trains of substantially uniform magnitude.

In some instances it has proven desirable to initiate the action of the control device C by an effect other than the "time break" voltage. It is well understood by those skilled in the art that the controlling device C is intended to operate during the period at which the geophone is actually subjected to the incoming wave trains; and that it would not be very desirable to initiate the action of the controlling device long before the arrival of the wave trains to be recorded.

In many instances (as, for example, in very deep surveying where relatively long "spreads" are used), the moment of explosion precedes the instant of arrival of the first incoming wave by a considerable interval of time, and consequently, if one initiates the action of the controlling device C at the instant of explosion, the amplification of the amplifiers $A_1$, $A_2$, $A_3$, $A_4$, $A_5$, $A_6$ will increase progressively during the said interval of time which precedes the instant of the arrival of the first wave train. Thus the amplification may become so large that the first incoming waves will be recorded with too large an amplitude which goes off the scale of the record.

The above inconvenience may be eliminated by providing an arrangement which will initiate the action of the controlling device C not at the instant of explosion, but at a later instant which may precede the arrival of the first waves or may occur a short time after the instant of their arrival. The above arrangement will consist of an additional geophone placed near the geophones $G_1$, $G_2$, $G_3$, $G_4$, $G_5$, $G_6$ and which receives the first wave train. The output of this additional geophone is amplified and is used as a signal for the initiation of the action of the control device C. Thus the action of the control device C will begin at the instant at which the first incoming wave train arrives at the additional geophone.

When reference is made to a "geophone," it is intended to include any electromechanical transducer which transforms one type of vibratory motion into another, and to designate instruments commonly known as geophones, seismographs, seismometers, seismoscopes, microphones, detectors, magnetophones, etc.

The expression "recorder" is intended to include any transducer which, when acted upon by the earth vibrations, produces a registration of the said vibrations. Such a transducer may be of the mechanical, electromechanical, or other type, and may consist of and include in its constitution means for receiving, detecting, translating, transmitting, amplifying, indicating and registering the said vibrations, or means for doing any of these things in addition to indicating or recording.

The expression "at the earth's surface" is intended to include a relatively thin stratum of the earth close to its surface.

When reference is made to "electrical means" it is intended to include all means wherein effects are produced by electricity as contrasted with mechanical movement.

Electrocity can itself be considered as a motion of elementary particles such as electrons, protons, ions, positrons, negatrons, and similar electrically charged bodies. Any such motion of electrons, protons, ions, positrons, negatrons, etc. is to be considered as an electrical effect, and the means for producing it is to be considered as an electrical means. In contrast thereto, "mechanical" movement includes only such motions as are performed by fabricated mechanical parts as a whole.

I wish to emphasize that the difference between mechanical and electrical effects lies not in the magnitude of the effects but in their nature. Mechanical effects are produced by the relative displacement of one fabricated element constituting a mechanism with respect to another such element, while in electrical effects no such displacements are involved.

When reference is made to "electronic" means it is meant to designate an electrical means which is acted upon and operates exclusively by means of electronic tubes, such as vacuum, gas filled, or vapor filled tubes of any desired form and construction which are provided with anodes, cathodes, or anodes, cathodes and control elements.

When reference is made to "controlling electrically," "controlling electronically," "restoring electrically" or "adjusting electrically" it is meant to control, restore or adjust by a method which is entirely electrical or electronic, as the case may be.

It will be evident that the discharge of the condenser 53 produces an electrical impulse which is variant and in fact decaying naturally in accordance with the time constant of the condenser circuit. The time constant is of course a function of the circuit parameters, which may be adjusted by varying the tap position on the resistance 14. The effect of the arrangement of Figure 4 is to impress on the amplifier, a variant voltage from an outside source. This variant voltage is in effect a controlling signal produced in the controlling circuit.

It will be evident that my invention may be applied to amplification control in other settings than those described without departing from the principles disclosed.

In view of my invention and disclosure, variations and modifications to meet individual whim or particular need will doubtless become evident to others skilled in the art to obtain all or part of the benefits of my invention without copying the structure shown and I therefore claim all such in so far as they fall within the reasonable spirit and scope of my invention.

Having thus described my invention, what I claim as new and desire to secure by Letters Patent is:

A device for geophysical prospecting that comprises means to create seismic waves in the earth, means to detect said waves and translate them into electrical vibrations, means to amplify said electrical vibrations including at least one thermionic tube amplifier containing a plurality of tubes, means to vary the biasing potential on the grid of at least two tubes operating out of phase but in cascade in said amplifier so as to control the degree of amplification of said vibrations without disturbing the base line thereof, and means to record said amplified vibrations.

SERGE A. SCHERBATSKOY.